Figure 1:
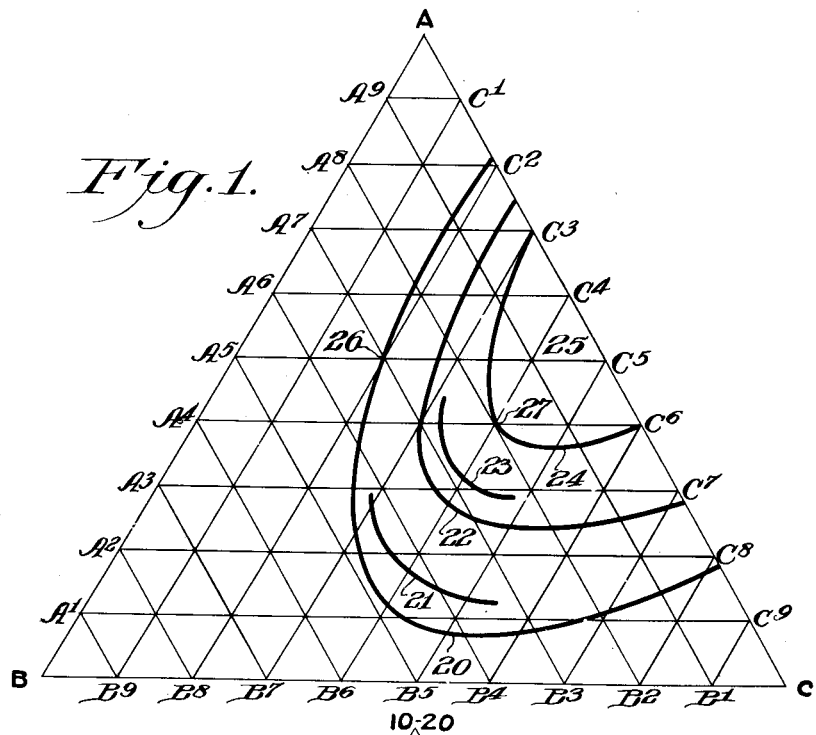

Nov. 1, 1932.    R. P. HEUER    1,886,185
REFRACTORY BRICK AND METHOD
Filed March 2, 1931    2 Sheets-Sheet 1

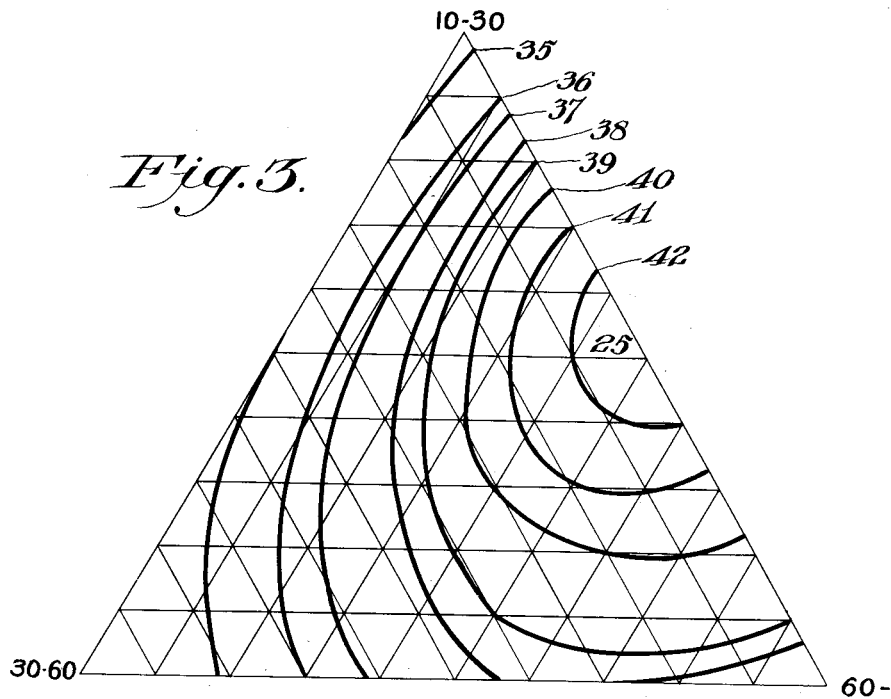
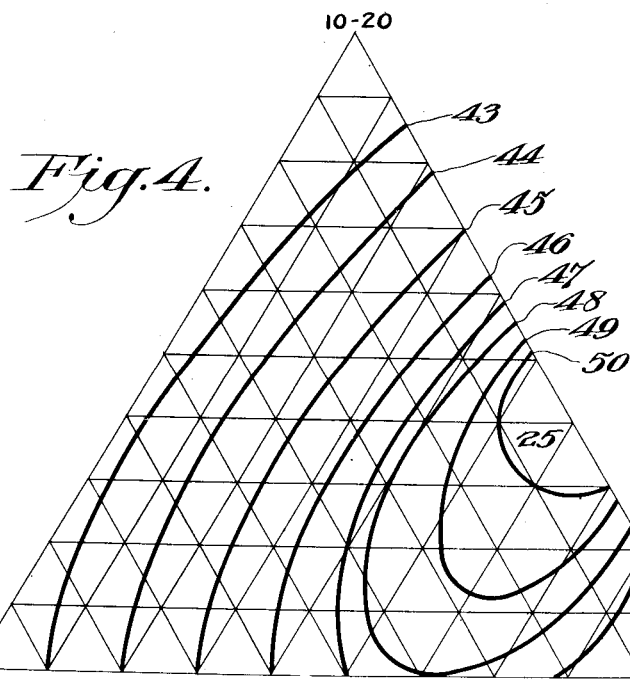

Patented Nov. 1, 1932

1,886,185

UNITED STATES PATENT OFFICE

RUSSELL P. HEUER, OF HAVERFORD, PENNSYLVANIA, ASSIGNOR TO GENERAL REFRACTORIES COMPANY, A CORPORATION OF PENNSYLVANIA

REFRACTORY BRICK AND METHOD

Application filed March 2, 1931. Serial No. 519,591.

My invention relates to refractory brick made from hydrous minerals of the alumina-silica series containing less than 60% of silica and to methods of making the same.

A purpose of my invention is to produce, from hydrous alumina-silica minerals, refractory brick which possess improved volume stability when heated to high temperatures under static loads.

A further purpose is to make brick, possessing improved volume stability at high temperatures, by incorporating in the raw brick mix high percentages of alumina-silica material which has previously been reduced to a volume stable condition by calcining raw hydrous alumina-silica materials.

A further purpose is to make refractory brick, using high percentages of volume stable calcine, in a way calculated to develop maximum interfitting and proper surface contact of the ground particles which compose the formed brick, by controlling the grain sizes of the ground particles and forming the brick under high pressure.

A further purpose is to make brick largely of calcined alumina-silica particles, adding only enough raw hydrous alumina-silica mineral to coat the calcined particles without forming a substantial body of raw mineral between the calcined particles, which would make the brick less refractory as well as less dense.

A further purpose is to combine graded sizes of calcined alumina-silica particles in proper proportions to produce a maximum density mix.

A further purpose is to apply, to a mix comprising calcined alumina-silica particles and less than 15% of raw hydrous alumina-silica mineral, pressure exceeding 1000 pounds per square inch (70.3 kilograms per square centimeter).

A further purpose is to bond an unfired brick comprising chiefly calcined alumina-silica particles by a temporary or permanent bonding agent other than a plastic hydrous alumina-silica mineral.

Further purposes appear in the specification and in the claims.

My invention relates both to the methods involved and to the article produced by the methods.

In the drawings, Figures 1, 2, 3 and 4 are ternary diagrams for three graded size bands of alumina-silica particles.

In the drawings like numerals refer to like parts.

The naturally occurring hydrous alumina minerals and the hydrous alumina-silica minerals are among the most important raw materials for making refractory brick. Since the hydrous alumina minerals contain very substantial quantities of silica as an impurity, I include them with the hydrous aluminum silicate minerals under the designation of hydrous alumina-silica minerals. Within this group are found, among other minerals, bauxite, diaspore, diasporitic clays, kaolin, bauxitic kaolin and the fireclays, including both the non-plastic or flint clays and the plastic or bonding clays. All of these minerals are hydrous, and present some difficulty in firing after forming into brick.

A raw hydrous alumina-silica mineral, if it be moistened, formed into brick, dried and placed in a kiln for firing, undergoes several changes during firing. As an example I will consider the behavior of a raw clay of composition $Al_2O_3 \cdot 2SiO_2 \cdot 2H_2O$.

In spite of the drying operation, some mechanically mixed moisture still remains. As the brick first becomes heated, this is driven off. During further heating, between 400 and 600° C., the chemically combined water, in this instance two molecules, is eliminated. The remaining clay at higher temperatures forms mullite, $3Al_2O_3 \cdot 2SiO_2$.

At high temperatures mullite crystals grow, producing a very desirable structure of long interlacing crystals. In ordinary firing practice, however, the temperature does not rise high enough to produce interlacing mullite crystals, and the mullite is finely divided and correspondingly weak.

Any excess of silica, which does not form mullite due to lack of alumina, is changed to crystobalite as the burning temperature increases. The presence of crystobalite is undesirable in many cases because crystobalite exhibts an abnormal thermal expansion at about 200° C., and is therefore likely to make the brick inferior.

At high temperatures the excess silica can be vitrified, destroying the crystobalite and producing a silica glass of the eutectic composition, 5% of alumina and 95% of silica. The alumina-silica eutectic is free from abnormal temperature expansion. The conversion of crystobalite into alumina-silica eutectic requires a temperature above 1400° C. for most clays.

Brick made of raw clay cannot be heated to the high temperature required to vitrify the silica and produce the eutectic because of distortion of the brick and because of the undesirably hard and over-burned structure resulting. As a consequence, such brick after firing consist of mullite in a finely divided condition and crystobalite, rather than interlaced mullite crystals and alumina-silica eutectic.

With raw hydrous alumina-silica minerals other than clay, the behavior during firing is very similar. Mullite is formed as far as possible. Any excess of silica above the mullite ratio is converted to crystobalite, or, if the temperature be high enough, to alumina-silica eutectic. When the alumina exceeds the mullite ratio corundum is also formed. The resultant brick are defective for the same reasons that brick made from raw clay are defective, namely, because of the numerous changes which the ingredients of the brick undergo during firing, such as elimination of water of composition, formation of mullite, conversion of silica to crystobalite, etc., each with its peculiar volume changes and alterations in the surfaces of contact of the constituent particles.

Recognizing the deficiencies of raw hydrous alumina-silica minerals, efforts have been made in the past to form brick from a mix consisting of raw alumina-silica mineral and a calcined alumina-silica mineral.

However, since the calcined particles are non-plastic, raw hydrous alumina-silica mineral has been mixed with the calcined mineral to bond the brick. To the extent of its presence, this adds the undesirable features previously noted which inhere to raw alumina-silica mineral, especially shrinkage. Nevertheless, raw mineral is supposed to be necessary for the sake of bonding.

As an example of prior practice, I will refer to the well known procedure used in making fireclay brick. A typical mix consists of 70% of raw flint clay, 20% of raw plastic clay and 10% of calcined clay or "grog". As much raw flint clay is used as possible, while the amount of plastic clay is maintained at a minimum, since it is the least refractory of all the ingredients. Brick containing an excess of plastic clay over that needed to bond the other ingredients are inferior because of excessive shrinkage of the plastic clay and because of burning of the plastic clay to a dense mass which spalls readily.

The mix is normally passed through a screen having between 3 mesh per linear inch (1.4 mesh per square centimeter) and 10 mesh per linear inch (15.5 mesh per square centimeter). Frequently the plastic clay is ground separately from the flint clay and to a greater extent, so that, for example, it will pass through a screen having 16 mesh per linear inch (39.7 mesh per square centimeter) or even 50 mesh per linear inch (387.5 mesh per square centimeter). The grog may be ground with either the flint clay or the plastic clay.

The mix is moistened with water and formed into brick by hand or by machine. For hand forming, sufficient water, as for example 14%, is used to develop the full plasticity of the clay. In the stiff mud process of machine forming, the clay is moistened with about 10% of water, extruded from an auger machine and formed under a press usually exerting less than 500 pounds per square inch (35.2 kilograms per square centimeter) pressure. In the dry press process about 7% of water is added, so that the clay, while not fully plastic, is in the condition of a moist foundry sand. The press pressures used are usually less than 1000 pounds per square inch (70.3 kilograms per square centimeter).

After forming the brick are dried to remove most of the water, and then fired up to temperatures of 1250 to 1450° C.

Although brick made by the process just described, and containing 10% of calcined alumina-silica mineral, are satisfactory for some purposes, they are lacking in volume stability and rigidity at high temperatures.

Quite recently, Harter and Kohler have, proposed, in U. S. Patent 1,530,260, that kaolin brick be made from a mix comprising 75% of calcined kaolin and 25% of raw kaolin. The 25% of raw hydrous alumina-silica mineral is assumed to be necessary to bond the calcined alumina-silica mineral. These patentees state that they prefer to employ a temperature of 3000 to 3250° F. for burning their brick. The resultant brick are said to withstand high load pressures at high temperatures, but this special burning process would seem to be expensive and difficult to manage.

Doubtless such temperatures are necessary where 25% of raw kaolin is used in the brick mix.

I have found that brick of desirable volume stability and rigidity can be made from hydrous alumina-silica minerals including kaolin without such high brick-firing temperatures as Harter & Kohler prefer. To do this I use a brick mix unnaturally low in raw hydrous alumina-silica mineral, preferably containing less than 20% or even being free from the raw hydrous mineral altogether.

I form at least 80% of the brick mix of a hydrous alumina-silica material which has been reduced to a suitable volume stable condition. Ordinary grog or ground brick bats are not suitable for this purpose. My calcine must be very dense and contain not more than 5% of open pore space. Here, as in other cases in which I refer to open pore space, I mean open pore space as tested by immersing in water under reduced pressure.

I prepare this dense calcine by heating a raw hydrous alumina-silica mineral preferably above the temperature of the eutectic of the alumina-silica series (1545° C.) and maintaining the temperature for a time sufficient to permit the viscous silicate glass to consolidate the mass to 5% or less or open pore space.

For alumina-silica minerals which contain fluxes such as soda, potash, lime, magnesia, iron oxide, etc., the temperature of the eutectic will be considerably reduced. I may correspondingly reduce the calcining temperature so long as I produce a calcine of 5% open porosity or less.

For higher alumina contents in the calcine, higher calcining temperatures will be necessary.

Whatever the raw material, I adjust the temperature and time of treating to obtain a calcined particle porosity of less than 5%, since I find it difficult to produce volume-stable brick of the quality which I desire if the calcine is more porous than the above figure.

By calcining at the high temperatures which I employ, I obtain long interlacing mullite crystals which add strength to the product. Any excess of silica, instead of being converted to crystobalite, is changed to the alumina-silica eutectic, which exhibits no abnormal thermal expansion.

I find that raw alumina-silica minerals, and particularly plastic or bonding clay, need not be used at all. And even where raw alumina-silica minerals are to be used, I find that the percentages required are much less than those which in the past have been considered minimal. I have discovered that the use of more than 15% of raw alumina-silica mineral with calcined mineral in a brick mix, instead of being necessary, is positively harmful.

Even though it lack plasticity, the calcined alumina-silica mineral can be bonded without any plastic or other mineral bond to produce brick exceeding in cold crushing strength those made from raw hydrous alumni-silica mineral.

The calcined alumina-silica mineral in all cases contains mullite, but its other important ingredient depends upon its composition. Raw flint clay will be calcined at a temperature above 1400° C., after which it will consist of mullite plus silica glass, substantially free from crystobalite. I preferably calcine kaolin, diaspore and bauxite to higher temperatures such as 1550 to 1650° C.

For kaolin and bauxite it is particularly advantageous to avoid the use of more than 15% raw mineral since raw kaolin and raw bauxite shrink excessively and yield inferior products.

I find that my invention is of limited utility when applied to making a brick containing a very high percentage of silica. For this reason I restrict my claims to the use of minerals for forming brick having a total silica content of less than 60%.

The formation of brick from calcined alumina-silica particles is greatly assisted by grading the sizes of the particles which are to go into the brick and by combining the graded sizes in proportions determined by studies made by me. Grading and combining of sizes reduce the need for bonding, and this is very important where, as in my brick, raw minerals are eliminated or maintained as low as 15%.

While the grading of sizes and the combining of size bands is advantageous even when applied to brick containing more than 15% of raw alumina-silica mineral, part of the advantage is lost in that case by shrinkage of the raw particles during firing or during heating in use. Where, however, grading of sizes and combining of size bands are applied to brick containing at least 85% and preferably 100% of calcined alumina-silica mineral, the full advantage of grading and combining is obtainable for the first time in alumina-silica brick, because none of the interfitting due to grading and combining is damaged by shrinkage and because the particles themselves are very dense.

In the drawings I illustrate ternary diagrams showing the effects of various graded size bands upon the density of alumina-silica brick.

Considering the generic diagram shown in Figure 1, various mixes of three different consecutive size zones or bands of graded particles of alumina-silica minerals are shown, mixed together in different proportions. I have discovered that the density of the mix is dependent upon the relative quantities of the different sizes of which the mix is made. The curves are contour curves, as it were, showing loci of equal density of brick plotted upon the ternary diagram and indicating the effect of various relative quantities of the different zones or bands of graded sizes of alumina-silica particles.

I have found that the best interfitting possible is obtained by eliminating an intermediate size of particles.

The three components A, B and C as indicated in Figure 1 consist respectively of consecutive size bands used in my tests. While in each test I have used particular size bands, my invention in its broadest aspects is independent of the size bands which are used.

The component A is made up of particles which pass through a screen which excludes particles too large for desirable use in a brick and which rest upon a screen of mesh size "$a$". The component B is made up of particles which are small enough to pass through a screen "$a$" and are large enough to rest upon a screen "$b$". The component C comprises those sizes which will pass through a screen "$b$".

In the diagram the proportion of the component A is indicated by the perpendicular distance of any point in question from the line BC, and, for convenience, the lines $A'$, $A^2$, $A^3$, $A^4$, $A^5$, $A^6$, $A^7$, $A^8$ and $A^9$ have been drawn parallel with the line BC to indicate percentages of component A from 10% to 90%. Correspondingly, the percentages of the component B are represented by the perpendicular distance from the line AC and for convenience in illustration, the lines $B'$ to $B^9$ have been drawn parallel to the line AC to show percentages of the component B from 10% to 90%. In the same manner, the perpendicular distance from the line AB represents percentages of the component C, and the lines $C'$ to $C^9$ indicate percentages of the component C from 10% to 90%.

At any point within the diagram the sum of the components A, B and C will equal 100%.

According to the above explanation and as a result of tests, isodensity curves 20, 21, 22, 23 and 24 have been drawn, each of which is the loci of mixtures of the different components A, B and C, which have the same density. The curves are numbered beginning with that of lowest density and proceeding to that of highest density.

It will also appear that for curves of lower density, such as 20, the variety of different mixtures is much greater than for curves of higher density, such as 24. Brick mixes of proportions indicated by location in the area 25 between the curve 24 and the line AC are of very high density.

In order that the application of the subsequent curves may be clear, I will first give applications upon the generic curve shown in Figure 1. For example, a refractory mix designated by location at the point 26 on curve 20 will contain 50% of component A, 30% of component B and 20% of component C, while a refractory located at the point 27 on curve 24 will have 40% of A, 20% of B and 40% of C.

Though the diagram of Figure 1 gives a good idea of the general principles applicable to all of the hydrous alumina-silica minerals, I have included three other diagrams for different materials in the hydrous alumina-silica group and for different size bands, illustrating the similarily of the specific curves to the generic curves.

Figure 2:
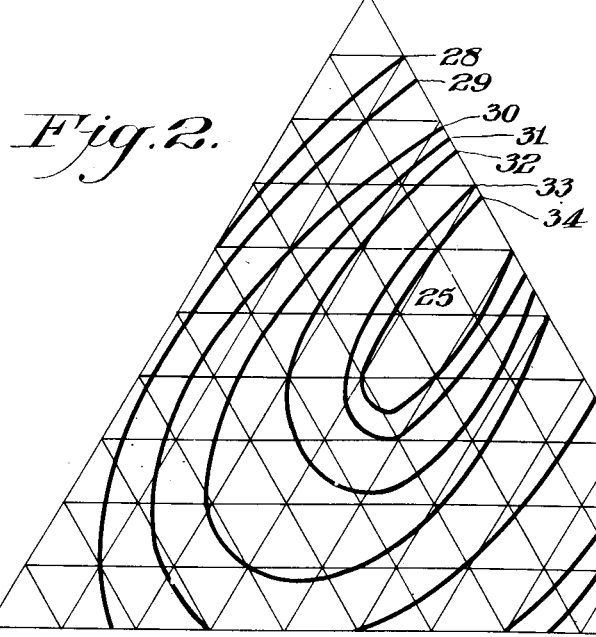

In Figure 2 the material used is calcined fireclay. The larger or A particles are such as pass through a screen having 10 mesh per linear inch (15.5 mesh per square centimeter) and rest upon a screen having 20 mesh per linear inch (62.0 mesh per square centimeter) and the intermediate or B band of particles pass through a screen having 20 mesh per linear inch (62.0 mesh per square centimeter) and rest upon a screen having 60 mesh per linear inch (558.0 mesh per square centimeter). The C particles are those which pass through a screen having 60 mesh per linear inch (558.0 mesh per square centimeter).

The isodensity curves 28 to 34 inclusive respectively show equal density calcined fireclay mixes of progressively greater density. It will be noted that as the percentage of B particles decreases, the density of the mixture increases. While the area 25 has a somewhat different shape in Figure 2 from that in Figure 1, its location is generally the same as in Figure 1.

Figure 3 shows a ternary diagram for calcined kaolin in which the A particles pass through a screen having 10 mesh per linear inch (15.5 mesh per square centimeter) and rest upon a screen having 30 mesh per linear inch (138.5 mesh per square centimeter). The B particles pass through a screen having 30 mesh per linear inch (139.5 mesh per square centimeter) and rest upon a screen having 60 mesh per linear inch (558.0 mesh per square centimeter), while the C particles pass through a screen having 60 mesh per linear inch (558.0 mesh per square centimeter).

Curves 35 to 42 inclusive are isodensity curves indicating progressively increasing densities as the B particles are reduced toward the zero line of B particles. Here again, the area 25, though differing somewhat in shape from that in Figures 1 and 2, is generally the same.

Figure 4 is a ternary diagram for calcined diaspore in which the A particles pass through a screen having 10 mesh per linear inch (15.5 mesh per square centimeter) and rest upon a screen having 20 mesh per linear inch (62.0 mesh per square centimeter). The B particles pass through a screen having 20 mesh per linear inch (62.0 mesh per square centimeter) and rest upon a screen having 80 mesh per linear inch (992.0 mesh per square centimeter), while the C particles pass through a screen having 80 mesh per linear inch (992.0 mesh per square centimeter).

Curves 43 to 50 inclusive are isodensity curves of progressively increasing density, as the percentage of B particles is reduced. The area 25 of high density is similar in location of that in the other figures.

Inspection of the diagrams of Figures 2, 3, and 4 indicates that substantial variations in the limits of the size bands may be made without altering the principles involved, since in any case the mix of maximum density has about the same percentages of A and C particles with abnormally low amounts of B particles.

The location of the area of maximum density is substantially the same for all hydrous alumina-silica minerals in non-plastic condition. Even though these various minerals may be plastic in their raw states, they are non-plastic when calcined. The general law here disclosed holds for materials which are non-plastic or substantially so, but does not apply to plastic materials, which do not follow the rules here explained. I find that the law applies to mixes of calcined hydrous alumina-silica minerals and plastic minerals provided the amount of plastic material does not exceed 15%.

The A particles should preferably range between 10 and 20 mesh per linear inch (15.5 and 62.0 mesh per square centimeter), although a range between 3 and 30 mesh per linear inch (1.4 and 139.5 mesh per square centimeter) is not undesirable. The fine particles should pass through a screen having 60 or 80 mesh per linear inch (558.0 or 992.0 mesh per square centimeter) or finer to get the best results. Fine grinding is expensive, however, and I find that the size of the fine screen may be 50 mesh per linear inch (387.5 mesh per square centimeter) without seriously affecting the quality of the brick.

It is evident that the densest brick is formed from a mix having proportions indicated by location in the area 25 between a curve of high density and the zero line for B particles. The mix which I preferably use consists of approximately 55% of A particles and approximately 45% of C particles without substantial quantities of B particles. I may however, employ between 70 and 30% of A particles and between 30 and 70% of C particles. It will be understood that advantage may be obtained from my invention without necessarily eliminating the B particles, provided they be maintained unnaturally low.

In this application I do not intend to claim broadly the use of particles graded according to the principles shown upon the ternary diagrams, but I wish to claim the features of grading which especially cooperate with the use of between 85 and 100% of calcined alumina-silica particles to produce a dense brick.

I much prefer high pressures for the pressing operation, since they more fully interfit the particles than is possible with lower pressures.

Prior to forming I moisten the mix, whether or not it consists of graded particles, with about 4% of water.

At the same time that the water is added, I may apply a temporary bonding agent. For this purpose about 1% of organic material, such as dextrin, tapioca flour, the tar-like residue from the sulphite paper process, etc., may be used.

A temporary bonding agent is desirable, but not essential, to increase the strength of the brick prior to firing, since the calcined alumina-silica mineral has no plasticity. The temporary binder preferably entirely disappears in firing.

I find that, instead of a temporary binder, I may employ a permanent binder and dispense altogether with firing. The firing operation is then replaced by the heating to which the brick is subjected during use. By high pressure and graded particle sizes the percentage of voids is maintained low, and the resulting brick compares favorably with fired brick.

Sodium silicate is a satisfactory permanent binder. However, the amount of sodium silicate should be reduced to a minimum, as it makes the brick less refractory. The elimination of raw alumina-silica mineral makes possible the use of less sodium silicate. Where brick bonded with sodium silicate is to be used unfired, the amount of raw alumina-silica mineral will preferably not exceed 5%, if indeed any raw mineral at all be used. High forming pressure and graded particle sizes also decrease the demand for sodium silicate.

Well bonded brick can be made using as little as 2% of sodium silicate. This quantity does not appreciably injure the refractory properties of the brick. Furthermore, the particles have volumetric stability, since the voids in the particles are reduced to 5% or less. The expense of firing is saved.

Bonding with sodium silicate is applicable to all the calcined hydrous alumina-silica minerals, such as flint clay, kaolin, diaspore, and bauxite.

In my invention I preferably use considerably higher forming pressures than in the prior art. I find it advantageous to subject the moistened mix to pressures exceeding 1000 pounds per square inch (70.3 kilograms per square centimeter), to give to the brick the very intimate particle interfitting conducive to strength. I preferably use graded particle sizes combined in the proportions indicated above and I prefer to increase the pressure to 5000 pounds per square inch (351.5 kilograms per square centimeter) and in some instances to 10,000 pounds per square inch (703 kilograms per square centimeter).

If the proper particle interfitting is obtained during the forming operation, and if the particles be preliminarily calcined so that shrinking will not destroy the interfitting during firing, I find that I may obtain very high volume stability and rigidity at high temperature without special firing procedure.

The pressed brick are of course dried before firing. The firing temperature need not exceed 1400° C. for fireclay. For kaolin, diaspore, diasporitic clays, bauxite, etc., I find 1500° C. a desirable temperature.

Burned fireclay brick of size 9×4.5×2.5 inches (22.9×11.4×6.3 centimeters) prepared according to my invention exhibit a cold crushing strength on the 4.5×2.5 inch (11.4×6.3 centimeter) face as high as 6000 pounds per square inch (421.8 kilograms per square centimeter). Under similar testing conditions, hand made flint clay brick often do not sustain 1000 pounds per square inch (70.3 kilograms per square centimeter) pressure, while machine made flint clay brick usually fall below 3000 pounds per square inch (210.9 kilograms per square centimeter) ultimate crushing strength.

Of course, where I use a permanent binder, I need not fire the brick, but I nevertheless gain advantage from the volumetric stability and close interfitting of the particles in increased cold crushing strength.

Likewise, my brick are very desirably refractory, sustaining crushing loads at high temperatures and strongly resisting spalling and slag penetration or attack. The low porosity of the brick is the property most closely associated with these desirable attributes. The decrease in the voids between particles is possible because of the volumetric stability of the particles, the grading and combining of particle sizes and the use of high pressure.

In making up the brick mix, I will use not more than 15% of raw alumina-silica mineral, so that shrinkage of the raw mineral will not seriously injure the interfitting of the particles, and so that there will not be formed, between the particles, a sufficient body of raw mineral to greatly reduce the refractory quality of the brick.

It will of course be evident that my brick mix need not consist of calcined particles prepared from the same mineral, nor of raw particles all of the same mineralogical character, nor need the mineral origin of the calcined particles be the same as that of the raw particles. When I speak of alumina-silica mineral, either raw or calcined, I intend to include the use of a single or of a plurality of mineral constituents, provided the predominant ingredients of the resultant mix are alumina and silica.

I recognize that grog has been generally used in the past in alumina-silica brick and that attempts have been made to incorporate large amounts of it in a mix for special purposes. Grog of the highly porous variety can be so applied but the brick produced are weak and the porous grog tends to shrink when such brick are put into use.

Decreasing the porosity of the grog to overcome the shrinkage has made the brick still weaker, with the result that the cure is worse than the disease. I find that by properly grinding, grading the sizes, and pressing the grog particles to obtain maximum interfitting and close surface contact, a very desirable bond, not heretofore obtainable in mixes low in raw hydrous material, can be produced. This bond is stronger with non-porous particles than with porous particles. Hence, I am able to obtain strength not previously obtained in ordinary high grog brick, as well as volume stability under high temperatures not heretofore obtained.

I believe that I am the first to make brick of desirable rigidity when hot from hydrous alumina-silica minerals using a mix comprising particles of volume stable calcine of 5% or less of open pore space and 15% or less of raw hydrous mineral.

I also believe that I am the first to grade and combine the sizes of particles of a mix comprising 85% or more of volume stable calcined alumina-silica mineral.

I believe that it is new to apply pressures in excess of 1000 pounds per square inch (70.3 kilograms per square centimeter) to brick mixes containing at least 85% of calcined alumina-silica particles.

I further believe that I am the first to add temporary or permanent bonding agents to mixes comprising 85% or more of calcined alumina-silica mineral.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of making refractory brick from hydrous alumina-silica mineral containing less than 60% of silica, which consists in calcining the mineral at a temperature above 1400° C. and in subsequently forming a mix containing at least 85% calcined mineral into brick under pressure exceeding 1000 pounds per square inch.

2. The method of making refractory brick from hydrous alumina-silica mineral containing less than 60% of silica, which consists in calcining the mineral at a temperature above 1400° C., in subsequently mixing, with the calcined mineral, raw hydrous alumina-silica mineral to the extent of less than 15% of the total, and in forming the mix into brick under pressure exceeding 1000 pounds per square inch.

3. The method of making refractory brick from hydrous alumina-silica mineral containing less than 60% of silica, which consists in calcining the mineral at a temperature above 1400° C. and in subsequently forming a mix containing the calcined mineral, free from other mineral except calcined mineral, into brick under pressure exceeding 1000 pounds per square inch.

4. The method of making refractory brick from hydrous alumina-silica mineral containing less than 60% of silica, which consists in calcining the mineral until its open pore space is reduced to 5% or less and in subsequently forming a mix containing at least 85% calcined mineral into brick under pressure exceeding 1000 pounds per square inch.

5. The method of making refractory brick from hydrous alumina-silica mineral containing less than 60% of silica, which consists in calcining the mineral until its open pore space is reduced to 5% or less, in subsequently mixing, with the calcined mineral, raw hydrous alumina-silica mineral to the extent of less than 15% of the total, and in forming the mix into brick under pressure exceeding 1000 pounds per square inch.

6. The method of making refractory brick from flint clay, which consists in calcining flint clay until its open pore space is reduced to 5% or less and in subsequently forming a mix containing at least 85% calcined flint clay into brick under pressure exceeding 1000 pounds per square inch.

7. The method of making refractory brick from hydrous alumina-silica mineral containing less than 60% of silica, which consists in calcining the mineral until its open pore space is reduced to 5% or less and in subsequently forming a mix containing calcined mineral, free from other mineral except calcined mineral, into brick under pressure exceeding 1000 pounds per square inch.

8. The method of making refractory brick from hydrous alumina-silica mineral containing less than 60% of silica, which consists in calcining the mineral until its open pore space is reduced to 5% or less, in mixing, with the calcined mineral raw hydrous alumina-silica mineral in quantity sufficient to coat the calcined particles and insufficient to form a substantial body of raw mineral between the calcined particles and in forming the mix into brick under pressure exceeding 1000 pounds per square inch.

9. The method of making refractory brick from hydrous alumina-silica mineral containing less than 60% of silica, which consists in calcining alumina-silica mineral, in mixing, with particles of calcined alumina-silica mineral, particles of raw hydrous alumina-silica mineral to the extent of less than 15% of the total, in forming the mix into brick under pressure exceeding 1000 pounds per square inch and in subjecting the brick to a firing temperature sufficient to cause the particles to bond.

10. The method of making refractory brick from hydrous alumina-silica mineral containing less than 60% of silica, which consists in calcining alumina-silica mineral, in forming particles of calcined alumina-silica mineral free from admixed particles of raw hydrous alumina-silica mineral into brick under pressure exceeding 1000 pounds per square inch and in subjecting the brick to a firing temperature sufficient to cause the calcined particles to bond themselves.

11. The method of making refractory brick from hydrous alumina-silica mineral, containing less than 60% of silica, and sodium silicate, which consists in calcining alumina-silica mineral, in mixing, with particles of calcined alumina-silica mineral, particles of raw hydrous alumina-silica mineral to the extent of less than 15% of the total, in mixing sodium silicate with the mineral, in forming the mix into brick under pressure exceeding 1000 pounds per square inch and in heating the brick during use in a furnace lining.

12. The method of making refractory brick from hydrous alumina-silica mineral, containing less than 60% of silica, and sodium silicate, which consists in calcining alumina-silica mineral, in mixing, with particles of calcined alumina-silica mineral, particles of raw hydrous alumina-silica mineral to the extent of less than 5% of the total, in mixing sodium silicate with the mineral to the extent of about 2% of the total, in forming the mix into brick under pressure exceeding 1000 pounds per square inch and in heating the brick during use in a furnace lining.

13. The method of making refractory brick from hydrous alumina-silica mineral, containing less than 60% of silica, and sodium silicate which consists in calcining alumina-silica mineral, in mixing sodium silicate with the calcined mineral, in forming particles of calcined alumina-silica mineral mixed with sodium silicate, free from particles of raw hydrous alumina-silica mineral, into brick under pressure exceeding 1000 pounds per square inch and in heating the brick during use in a furnace lining.

14. The method of making refractory brick from hydrous alumina-silica mineral, containing less than 60% of silica, and an organic binder, which consists in calcining the mineral, in mixing, with particles of calcined mineral, particles of raw mineral to the extent of less than 15% of the total, in mixing an organic binder with the mineral, in forming the mix into brick under pressure exceeding 1000 pounds per square inch and in subjecting the brick to firing temperature.

15. The method of making refractory brick from hydrous alumina-silica mineral containing less than 60% of silica, which consists in calcining the mineral until its open pore space is reduced to 5% or less, in combining larger and smaller particles in which calcined particles comprise at least 85% of the combined mix, while omitting intermediate sized particles and in forming the combined mix into brick under pressure exceeding 1000 pounds per square inch.

16. The method of making refractory brick from hydrous alumina-silica mineral containing less than 60% of silica, which consists in calcining the mineral until its open pore space is reduced to 5% or less, in combining in moist condition larger and smaller particle sizes in nearly equal proportion, omitting intermediate sized particles to produce a mix containing at least 85% calcined mineral and in forming the mix into brick under pressure exceeding 1000 pounds per square inch.

17. The method of making refractory brick from hydrous alumina-silica mineral containing less than 60% of silica, which consists in calcining the mineral at a temperature above 1400° C., in mixing particles between 3 and 30 mesh and particles smaller than 50 mesh, keeping the quantity of intermediate sized particles abnormally low as compared with the quantity secured in ordinary grinding, and using sufficient calcined mineral so that it comprises 85% of the total mix and in forming the mix into brick under pressure exceeding 1000 pounds per square inch.

18. The method of making refractory brick from hydrous alumina-silica mineral containing less than 60% of silica, which consists in calcining the mineral until its open pore space is 5% or less, in mixing particles between 3 to 30 mesh and particles smaller than 50 mesh in proportions of from 30 to 70% of each, using sufficient calcined mineral so that it comprises 85% of the total mix and in forming the mix into brick under pressure exceeding 1000 pounds per square inch.

19. An alumina-silica brick formed from a mixture containing less than 60% of silica and less than 15% of raw hydrous alumina-silica mineral and having its particles tightly interfitted.

20. An alumina-silica brick formed from a mixture containing less than 60% of silica and more than 85% of calcined alumina-silica mineral and having its particles tightly interfitted.

21. An alumina-silica brick formed from a mixture having all of its mineral content as calcined alumina-silica mineral and having its particles tightly interfitted.

22. An alumina-silica brick formed from a mixture containing less than 60% of silica and more than 85% of alumina-silica particles whose open pore space is 5% or less and having its particles tightly interfitted.

23. An alumina-silica brick formed from a mixture containing less than 60% of silica, having all of its mineral content as alumina-silica particles whose open pore space is 5% or less and having its particles tightly interfitted.

24. An alumina-silica brick formed from a mixture containing less than 60% of silica and more than 85% of calcined alumina-silica mineral, free from plastic mineral ingredients, and having its particles tightly interfitted.

25. An alumina-silica brick formed from a mixture containing less than 60% of silica, more than 85% of calcined alumina-silica mineral and sufficient raw hydrous alumina-silica mineral to coat the particles without producing a substantial body of raw mineral between particles, and having its particles tightly interfitted.

26. An alumina-silica brick formed from a mixture containing less than 60% of silica, more than 85% of calcined alumina-silica mineral and sodium silicate and having its particles tightly interfitted.

27. An alumina-silica brick formed from a mixture containing less than 60% of silica, and containing calcined alumina-silica mineral and sodium silicate, having all of its mineral content as alumina-silica particles whose open pore space is 5% or less and having its particles tightly interfitted.

28. An alumina-silica brick formed from a mixture containing less than 60% of silica, more than 85% of calcined alumina-silica mineral and about 2% of sodium silicate, and having its particles tightly interfitted.

29. An alumina-silica brick formed from a mixture containing less than 60% of silica, more than 85% of calcined alumina-silica mineral and an organic binder and having its particles tightly interfitted.

30. An alumina-silica brick formed from a mixture containing less than 60% of silica and more than 85% of calcined alumina-silica mineral, comprising larger and smaller particles densely compacted together and abnormally deficient in intermediate sized particles.

31. An alumina-silica brick formed from a mixture containing less than 60% of silica and more than 85% of calcined alumina-silica mineral, comprising particles between 3 and 30 mesh and particles smaller than 50 mesh densely compacted together and unnaturally deficient in particles of intermediate size.

32. An alumina-silica brick formed from a mixture containing less than 60% of silica and more than 85% of calcined alumina-silica mineral, comprising particles between 3 and 30 mesh and particles smaller than 50 mesh in proportions of between 30 and 70% of each, densely compacted together and unnaturally deficient in particles of intermediate size.

RUSSELL P. HEUER.